US009594795B1

(12) United States Patent
Koli et al.

(10) Patent No.: US 9,594,795 B1
(45) Date of Patent: Mar. 14, 2017

(54) MAINTAINING DATA CONSISTENCY WHEN DATA IS CHANGED OUT FROM UNDER ANOTHER DATA SERVICE

(71) Applicant: EMC Corporation, Hopkinton, MA (US)

(72) Inventors: Milind Koli, Morrisville, NC (US); Alan L. Taylor, Cary, NC (US); John H. Lee, Durham, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 575 days.

(21) Appl. No.: 13/929,892

(22) Filed: Jun. 28, 2013

(51) Int. Cl.
*G06F 17/30* (2006.01)

(52) U.S. Cl.
CPC .. *G06F 17/30371* (2013.01); *G06F 17/30091* (2013.01)

(58) Field of Classification Search
CPC ................................. G06F 17/30091
USPC ........................................ 707/690
See application file for complete search history.

(56) References Cited

U.S. PATENT DOCUMENTS

| | | | |
|---|---|---|---|
| 7,475,167 B2 | 1/2009 | Wunderlich et al. | |
| 2003/0115168 A1* | 6/2003 | Robison | G06F 17/30345 |
| 2004/0117369 A1* | 6/2004 | Mandal | G06F 3/0605 |
| 2004/0117436 A1* | 6/2004 | Newman et al. | 709/203 |
| 2007/0067302 A1* | 3/2007 | Bailey et al. | 707/10 |
| 2009/0037456 A1* | 2/2009 | Kirshenbaum et al. | 707/102 |
| 2009/0157627 A1* | 6/2009 | Arthursson | G06F 9/45504 |
| 2010/0332846 A1* | 12/2010 | Bowden et al. | 713/189 |
| 2012/0023077 A1* | 1/2012 | Kann | G06F 17/30581 707/702 |
| 2012/0150805 A1* | 6/2012 | Pafumi | G06F 11/1415 707/640 |
| 2012/0159421 A1* | 6/2012 | Driesen | G06F 11/0718 717/101 |
| 2013/0332660 A1* | 12/2013 | Talagala | G06F 12/0246 711/103 |
| 2014/0068213 A1 | 3/2014 | Maeda | |
| 2014/0137071 A1* | 5/2014 | Wadhwani | G06F 11/3604 717/101 |
| 2014/0143286 A1 | 5/2014 | Knight et al. | |

* cited by examiner

*Primary Examiner* — James Trujillo
*Assistant Examiner* — Jessica N Le
(74) *Attorney, Agent, or Firm* — BainwoodHuang

(57) ABSTRACT

An improved technique involves managing conflicts over data changes between a data change initiator and multiple listeners to allow any of the listeners to prevent the initiator from changing data. Along these lines, a data change notification process resides in a storage processor in memory outside of an I/O stack in which the listeners and data change initiators reside. When a data change initiator prepares to perform a data change operation, it notifies the data change notification process. The data change notification process in turn sends a notification to the listeners that have registered with the data change notification process. If there is a peer data change notification process on another storage processor, the data change notification process sends a notification to that peer data change notification process so that the peer data change notification process may notify its registered listeners.

14 Claims, 4 Drawing Sheets

9,594,795 B1

MAINTAINING DATA CONSISTENCY WHEN DATA IS CHANGED OUT FROM UNDER ANOTHER DATA SERVICE

BACKGROUND

Data storage systems are arrangements of hardware and software that may include multiple storage processors coupled to arrays of non-volatile storage devices. In typical operation, the storage processors service storage requests that arrive from users. The storage requests specify files or other data elements to be written, read, created, or deleted, for example. The storage processors may each run software that manages incoming storage requests and performs various data processing tasks to organize and secure user data stored on the non-volatile storage devices.

Some storage processors run multiple software operations that may conflict with one another. For example, a storage processor may run both software for performing data backup operations and software for performing data restore operations. Suppose that, while a data backup operation is running on a set of data, a user invokes a data restore operation which attempts to restore the same set of data to a previous state. The data restore operation conflicts with the data backup operation because the data backup operation requires that the data remain unchanged while it runs.

SUMMARY

Some conventional data storage systems handle potentially conflicting operations by having the data restore operation inform the data backup operation of an intention to change data on disk. The data backup operation may either attempt to block the data restore operation at least until the data backup has is completed, or it may stop itself and allow the data restore operation to commence.

Unfortunately, there are deficiencies in the above-described approach. For example, the prior approach allows only a single software entity to be notified of a potentially conflicting data change operation. In many cases, however, there are multiple entities that have a stake in the integrity of the data in storage. Further, different software entities may run on different storage processors. For example, an offloaded data transfer (ODX) operation moves data between two LUNs, each being controlled by its own storage processor. Suppose that a data restore operation is preparing to run on a first storage processor connected to a LUN to restore data to that LUN while an ODX operation is also running on a second storage processor to transfer data to the same LUN. The conventional approach is unable to inform the ODX operation about the restore operation affecting the same data because the ODX operation is being run on a different storage processor.

In contrast with the above-described conventional data storage systems, an improved technique manages conflicts over data changes between a data change initiator and multiple listeners to allow any of the listeners to prevent the initiator from changing data. When a data change initiator prepares to perform a data change operation, it notifies a data change notification entity. The data change notification entity in turn sends a notification to each of the listeners. Upon receiving a response from any listener that the data change presents a conflict, the data change notification entity directs the data change initiator not to perform the data change it was preparing. If there is no conflict, then a data change notification is followed by a start operation if there is no conflict. Advantageously, the improved technique prevents a data change operation from causing a loss of data integrity due to conflicting operations.

One embodiment of the improved technique is directed to a method of providing data change notifications in a data storage environment. The method includes receiving a request from a data change initiator to perform a data change operation in a set of storage devices coupled to the storage processor. The method also includes sending a notification message to each of multiple listeners operating in the storage processor to notify each of the set of listeners that the data change initiator is preparing to perform the data change operation. The method further includes receiving a response from any of the listeners in the storage processor, in response to sending the respective listener a notification message, that the listener indicates a conflict with the data change operation. The method further includes directing the data change initiator not to perform the data change operation in response to receiving a response that a listener indicates a conflict.

Additionally, some embodiments of the improved technique are directed to a data storage apparatus constructed and arranged to provide a data change notifications in a data storage environment. The data storage apparatus includes a set of storage devices and a storage processor. The storage processor includes memory and a set of processors coupled to the memory to form controlling circuitry. The controlling circuitry is constructed and arranged to carry out the method of providing a data change notifications in a data storage environment.

Furthermore, some embodiments of the improved technique are directed to a computer program product having a non-transitory computer readable storage medium which stores code including a set of instructions which, when executed by a computer, cause the computer to carry out the method of providing a data change notifications in a data storage environment.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves managing conflicts over data changes between a data change initiator and multiple listeners to allow any of the listeners to prevent the initiator from changing data.

Figure 1:
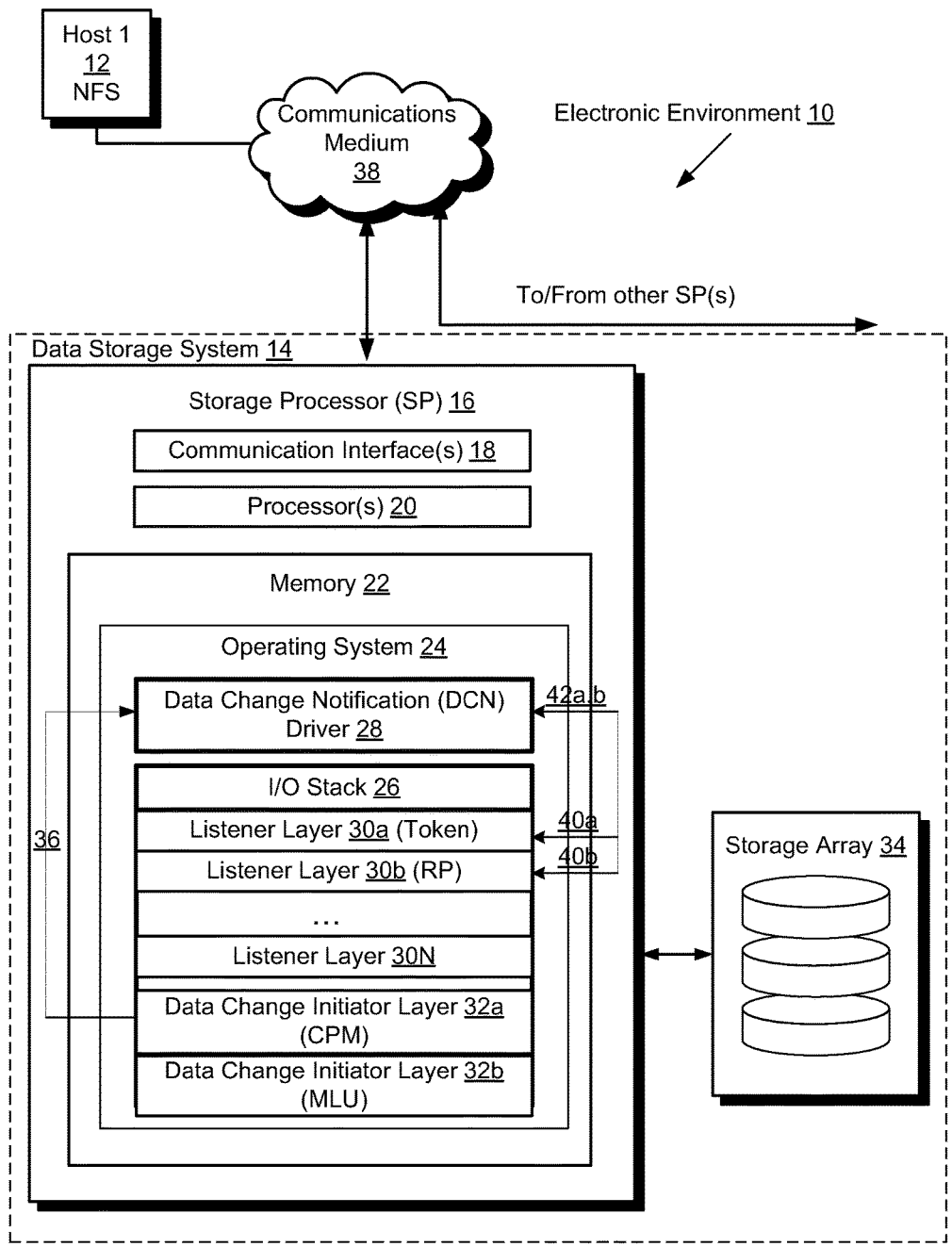
FIG. 1 is a block diagram illustrating an example electronic environment in which the improved technique hereof can be carried out.

FIG. 1 illustrates an electronic environment 10 in which the improved technique may be carried out. Electronic environment 10 includes host 12, data storage system 14, which in turn includes storage processor 16 and storage array 34, and communications medium 38. Storage array 34 is provided, for example, in the form of hard disk drives, solid state drivers, and/or electronic flash drives (EFDs). Data storage system 14 may, however, include multiple storage processors like storage processor 16. For instance, multiple storage processors may be provided as circuit board assemblies, or "blades," which plug into a chassis that encloses and cools the storage processors. The chassis has a backplane for interconnecting the storage processors, and additional connections may be made among storage processors using cables. It should be understood, however, that no particular hardware configuration is required, as any number of storage processors (including a single one) can be provided and storage processor 16 can be any type of computing device.

Communications medium 38 can be any type of network or combination of networks, such as a storage area network (SAN), local area network (LAN), wide area network (WAN), the Internet, and/or some other type of network, for example. In an example, host 12 connects to storage processor 16 using various technologies. For example, host 12 can connect to the storage processor 16 using any NFS, CIFS, SMB 3.0, Fibre Channel, and iSCSI protocols, for example. Any number of hosts (not pictured) may be provided, using any of the above protocols, some subset thereof, or other protocols besides those shown. As is known, NFS, SMB 3.0, and CIFS are file-based protocols, and Fibre Channel, and iSCSI are block-based protocols. Storage processor 16 is configured to receive requests according to any of the above protocols and to respond to such requests by reading or writing storage array 34.

Host 12 may be configured to send file system requests to storage processor 16 via communications medium 38. In some arrangements, host 12 is a desktop computer; in other arrangements, host 12 can each be a server, a laptop computer, a tablet computer, or any other electronic device having a processor capable of issuing requests.

Storage processor 16 is seen to include a communication interface 18, a set of processing units 20, and memory 22. Communication interface 18 includes, for example, network interface adapters, for converting electronic and/or optical signals received from the communications medium 38 to electronic form for use by storage processor 16. The set of processing units 20 includes one or more processing chips and/or assemblies. In a particular example, the set of processing units 20 includes numerous multi-core CPUs. Memory 22 includes both volatile memory (e.g., RAM), and non-volatile memory, such as one or more ROMs, disk drives, solid state drives (SSDs), and the like. The set of processing units 20 and memory 22 together form control circuitry, which is constructed and arranged to carry out various methods and functions as described herein. Also, memory 22 includes a variety of software constructs realized in the form of executable instructions. When the executable instructions are run by set of processing units 20, the set of processing units 20 is caused to carry out the operations of the software constructs. Although certain software constructs are specifically shown and described, it is understood that memory 22 typically includes many other software constructs, which are not shown, such as various applications, processes, and daemons.

As shown, memory 22 includes instructions for an operating system 24, such as Windows™. Memory 22 further includes a data change notification (DCN) driver 28 and an IO stack 26.

IO stack 26 provides an execution path for host IOs such as host 12 and includes a set of layers in which instructions for various data storage operations reside. In upper layers of IO stack 26 reside listener layers 30a, 30b, . . . , 30N (listeners 30). For example, listener layer 30a contains instructions for an token driver, while listener layer 30b contains instructions for a RecoverPoint™ driver. In lower layers of IO stack 26 reside instructions for data change initiators 32a, 32b (data change initiators 32). For example, in one layer resides instructions for a copy manager (CPM) driver 32a, and in another layer resides instructions for a mapped LUN (MLU) driver 32b.

DCN driver 28 resides outside of IO stack 26 and is configured to receive messages from data change initiators 32 regarding data change operations that are about to commence. DCN driver 28 is also configured to send notifications to registered listeners (say, 30a and 30b) regarding the commencing data change operations. In some arrangements, DCN driver 28 resides in a kernel stack. In some further arrangements, when the operating system 24 is Windows, DCN driver 28 takes the form of a kernel mode DLL. These are merely examples, however.

During operation, as part of a boot process of operating system 24, listeners 30a and 30b register with DCN driver 28. The registration process involves, in some arrangements, listeners 30a and 30b sending a message to DCN driver 28 and DCN driver sending an acknowledgment in return. By registering, listeners 30a and 30b are making their presence known to DCN driver 28 which resides outside of IO stack 26. Listeners 30a and 30b register with DCN driver 28, as opposed to other listeners, due to circumstances expressed in the boot process. For example, listener 30a and 30b may have a particular interest in the integrity of data stored in storage array 34.

Sometime later, data change initiator 32a begins preparations to initiate a CPM operation. CPM copies data between LUNs and receives instruction through its DLL structure or indirectly through a user interface-based instruction.

During these preparations, DCN driver 28 detects the preparations. For example, data change initiator 30a may send DCN driver a notification 36 that it intends to change data stored in storage array 34.

Upon receipt of the notification 36, indicating detection of the preparations, DCN driver 28 sends notifications 40a and 40b to registered listeners 30a and 30b, respectively. Notifications each 40a and 40b include a description of the data change operation, including, for example, a LUN WWN ID, begin time, duration, and locations of data to be changed by the data change operation.

Upon receipt of notifications 40a and 40b, listeners 30a and 30b determine whether to send responses to DCN driver 28. For example, if listener 30a determines that the data change operation will not conflict with the ODX operation, listener 30a may send a response expressing disapproval of the data change operation; in some arrangements, listener 30a may send a response 42 to DCN driver 28 approving of the data change operation. In another example, listener 30b determines that the data change operation will conflict with the ODX operation. In this case, listener 30b sends a response 42 indicating that the data change operation presents a conflict.

In the case of a single response 42 from one of the listeners 30, DCN driver 28 directs the data change initiator 30a not to perform the data change operation. For example, DCN driver 28, in some arrangements, can cause a fail condition to be returned to data change initiator 32a. Upon receipt of the fail condition, data change initiator 32a may restart preparations for the data change operation.

It should be understood that the above-described procedure of ensuring data integrity in the face of potentially conflicting data change operations works with multiple listeners within a single storage processor 16. The improved technique, however, also works to ensure data integrity across multiple storage processors 16, details of which are described below in connection with FIG. 2.

Figure 2:
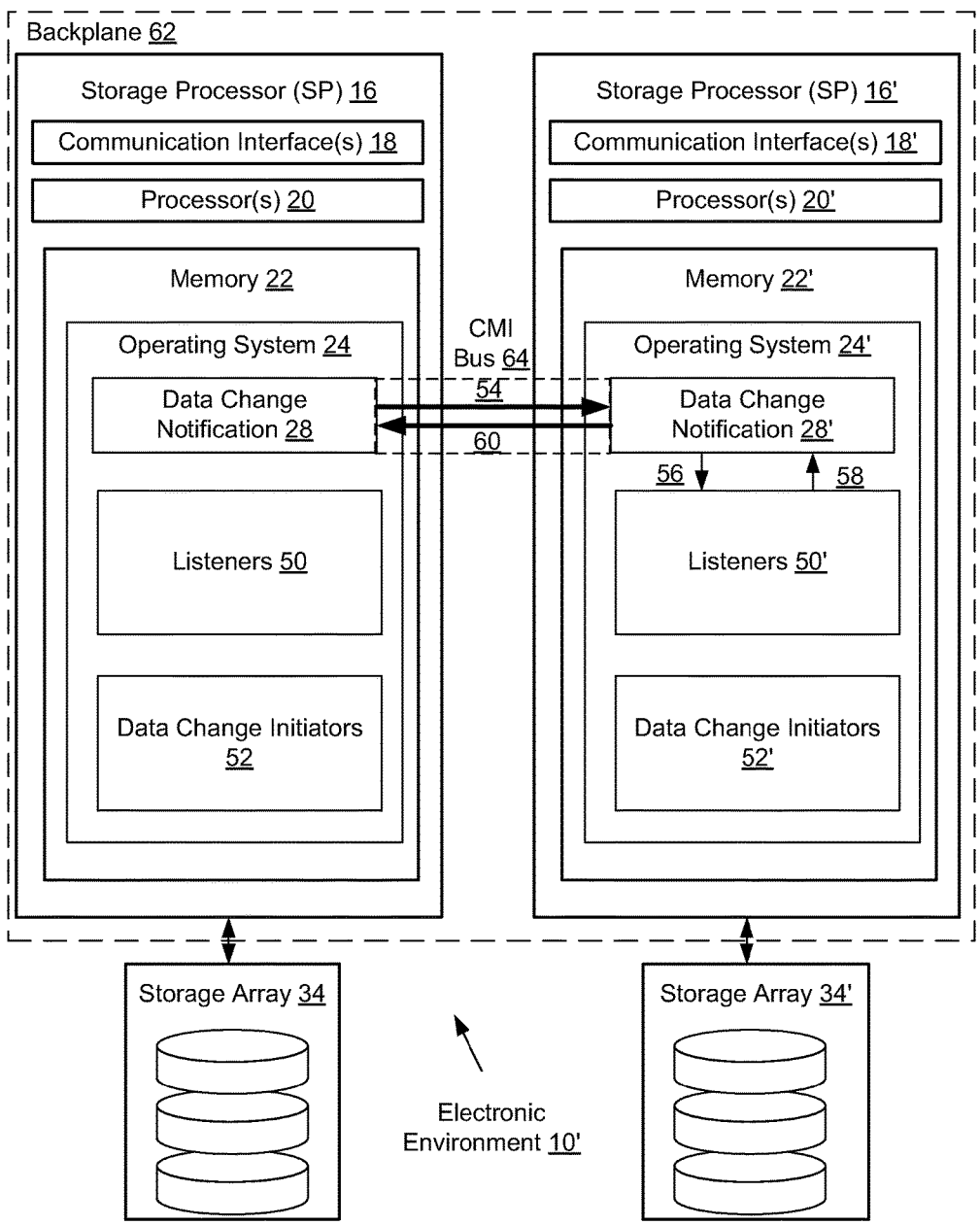
FIG. 2 is a block diagram illustrating example details of the electronic environment of FIG. 1.

FIG. 2 illustrates another example electronic environment 10' in which there are two storage processors 16 and 16' servicing two separate storage arrays 34 and 34'. Storage processor 16' is analogous to storage processor 16 in that it contains peer DCN driver 28', listeners 50', and data change initiators 52'. In this example storage processors 16 and 16' are both installed in a common backplane 62 and are connected over a common memory interconnect bus 64. In some arrangements, however, storage processors 16 and 16' may be in different locations and connected by a remote network connection.

During an example operation, listeners 50 register with DCN driver 28 during a boot sequence for storage processor 16, and listeners 50' register with DCN driver 50' during a boot sequence for storage processor 16'. Sometime later, data change initiator 52 begins preparations to begin a data change operation.

Upon detection of the preparations, DCN driver 28 sends a notification to its registered listeners 50 regarding the data change operation as described above. In addition, however, DCN driver 28 also sends a notification 54 to peer DCN driver 28'. Notification 54 contains similar content as notifications 40a and 40b described above, except that in addition, notification 54 also contains an identifier of the storage processor generating the notification, as well as an identifier of the LUN in which data being affected by the data change operation is stored.

Upon receipt of notification 54, peer DCN driver 28' generates notifications 56 notifying its registered listeners 50' of the data change operation. Registered listeners 50' send responses 58 to notifications 56 with indicating either that the data change operation presents a conflict or does not presented a conflict. Upon receiving responses 58, peer DCN driver 28' sends a response 60 to DCN driver 28 with a notification of whether at least one registered listener 50' indicated a conflict with the data change operation.

It should be understood that only a single conflict from any of registered listeners 50 or 50' is enough for DCN driver 28 to cause the preparations for the data change operation to be aborted. Data change initiator 52, however, is free to restart preparations for the data change operations any time after receiving a notification that the previous data change operation failed.

Figure 3:
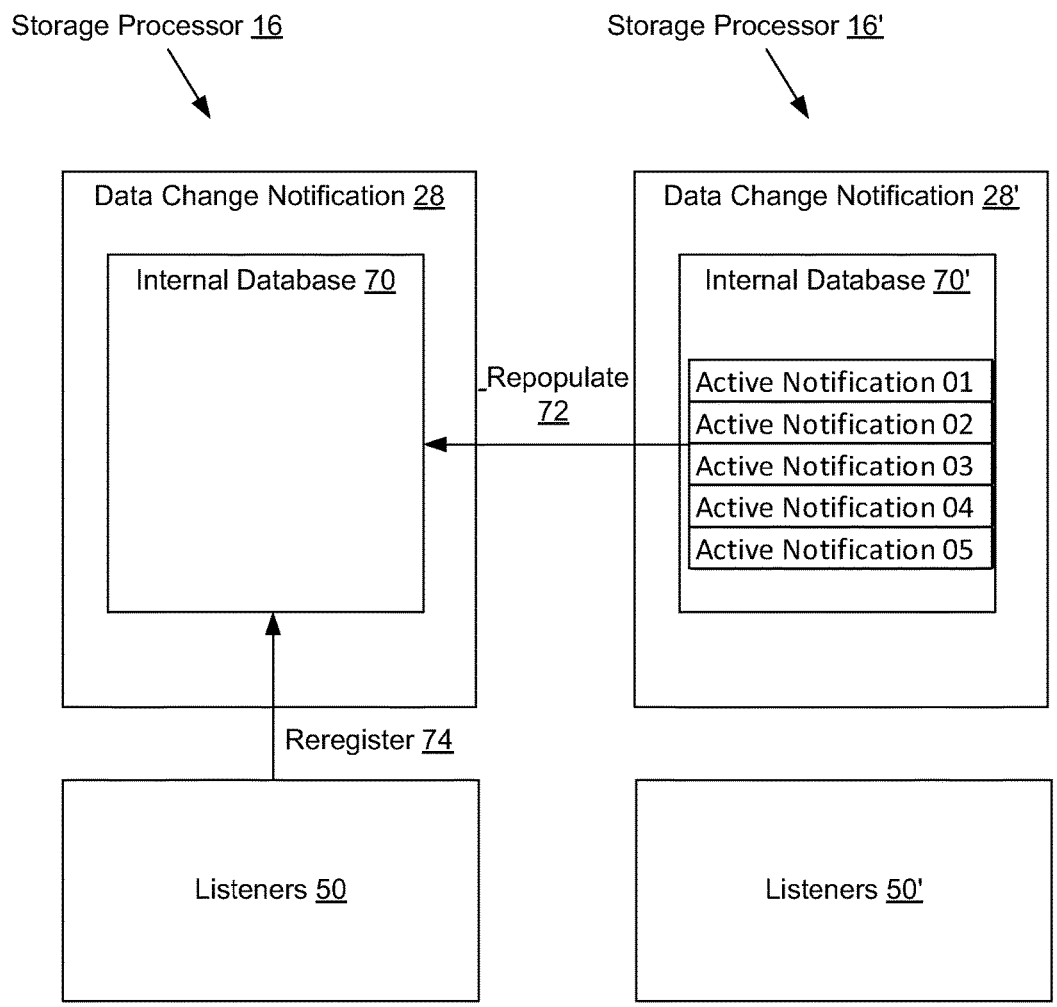
FIG. 3 is a block diagram illustrating an example recovery from a reboot in the electronic environment of FIGS. 1 and 2.

Further details of DCN drivers 28 and 28' are discussed below in connection with FIG. 3. FIG. 3 illustrates DCN drivers 28 and 28', each of which includes an internal database 70 and 70', respectively.

Databases 70 and 70' each are configured to store records of active data change notifications. An active data change notification is a notification that has been issued to a listener with a pending response. By keeping track of active data change notifications, DCN drivers 28 and 28' each create a redundant history of these active notifications. As only active notifications are tracked, it is not necessary that databases 70 and 70' be non-persistent.

To effect the creation of a record in databases 70 and 70', respective DCN driver 28 and 28' issues a DCN Start Notification message upon issuing notifications to its respective registered drivers 50 and 50'. In addition, to effect the deletion of a record in internal databases 70 and 70', DCN driver 28 and 28' issues, upon receipt of a message from data change initiator 52, a DCN Complete Notification message after receiving responses from all registered drivers 50 and 50'. On receiving the complete notification, DCN driver 28 and 28' will remove the records associated with the DCN Complete Notification. It should be understood that all registered drivers includes a peer DCN driver if a notification was sent to that peer DCN driver. In this way, it may be understood that DCN driver 28 is populating the internal database of DCN driver 28'.

Advantageously, as mentioned above, internal databases 70 and 70' form a redundant pair (or more generally, a redundant group, as there may be more than two storage processors) when DCN drivers 28 and 28' send each other notifications of data change operations being prepared in their respective storage processors. This advantage comes into play when one of the storage processors (say, 16) is forced to reboot due to, e.g., a system crash, while active notification records are present in internal database 70.

Upon a reboot, DCN driver 28 sends a reboot notification to peer DCN driver 28'. Upon receiving the reboot notification, peer DCN driver 28' sends a repopulate message 72 to DCN 28 containing the records of the active notifications within internal database 70'. Upon receiving repopulate message 72, DCN driver 28 repopulates internal database 70 with the records contained in repopulate message 72. DCN driver 28 then reregisters listeners 50 as is typical in a boot sequence; a difference is that the registration process occurs after internal database 70 has been repopulated. Once listeners 50 are registered, DCN driver 28 sends each registered listener 50 a notification corresponding to each active notification record in internal database 70.

In some arrangements, during an active notification period, DCN driver 28 and its peer 28' imposes a blackout condition on each of its registered listeners 50 and 50', respectively. In this case, DCN driver 28 and its peer 28' places restrictions on the activities of listeners so that listeners 50 and 50' may have resources to assess whether the data change operation may take place. Once the active notification period ends (i.e., DCN driver 28 issues a DCN Complete notification), DCN driver 28 and it peer 28' ends the blackout condition.

Figure 4:
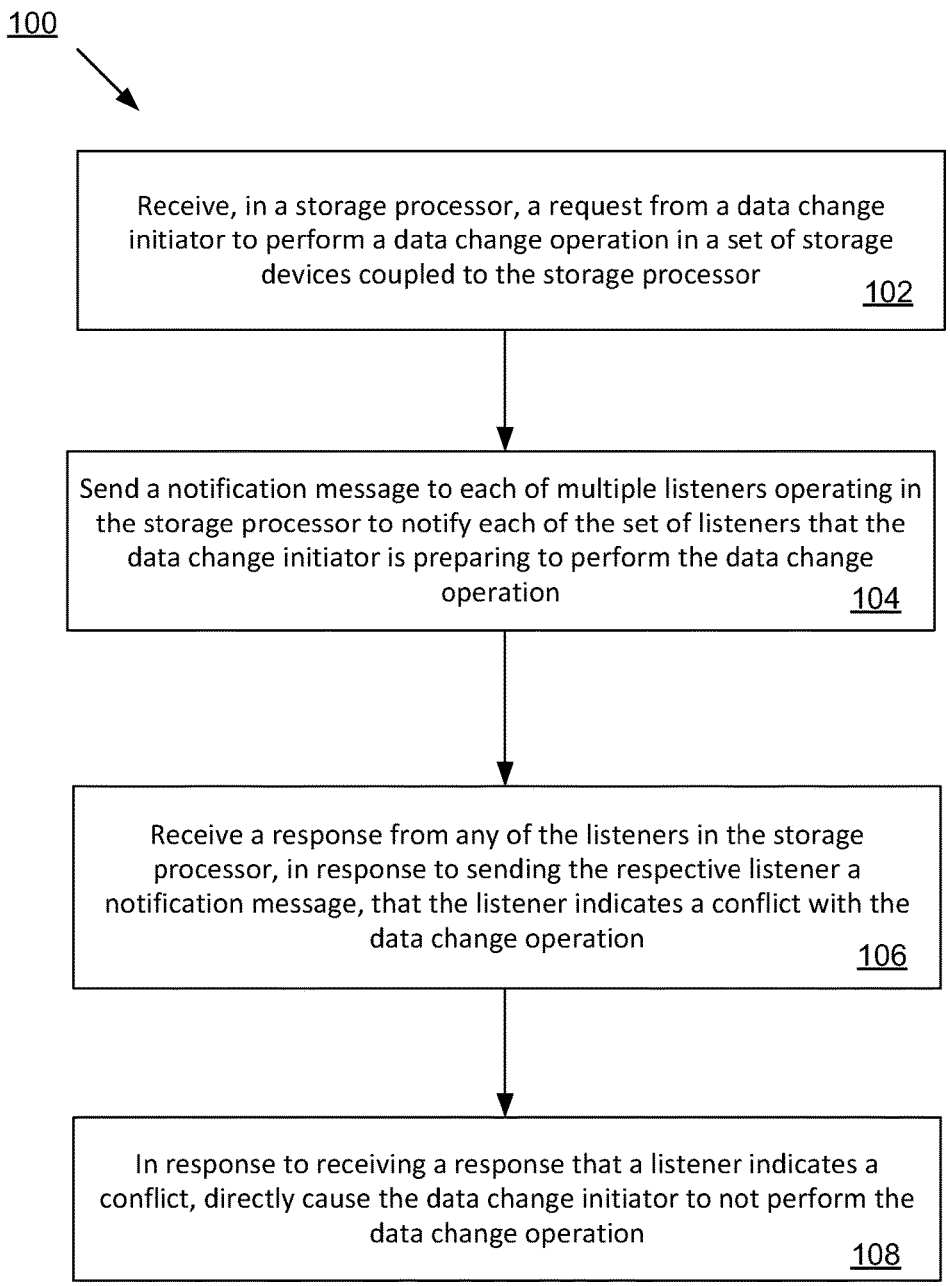
FIG. 4 is a flow chart illustrating an example method of carrying out the improved technique within the electronic environment shown in FIGS. 1 and 2.

FIG. 4 illustrates a method 100 of providing a DCN process in a data storage environment that includes a set of storage devices coupled to a storage processor, including steps 102, 104, 106, and 108.

In step 102, a request is received from a data change initiator to perform a data change operation in the set of storage devices. For example, a data change initiator begins preparations for a data restore operation and the DCN driver detects the preparations.

In step 104, a notification message is sent to each of multiple listeners operating in the storage processor to notify each of the set of listeners that the data change initiator is preparing to perform the data change operation. For example, the DCN driver sends notifications to registered listeners such as an ODX driver and a RecoverPoint driver that a data restore operation is about to take place.

In step 106, a response is received from any of the listeners in the storage processor, in response to sending the respective listener a notification message, that the listener indicates a conflict with the data change operation. For example, the ODX driver determines that there is a conflict and so notifies the DCN driver.

In step 108, the data change initiator is directed not to perform the data change operation in response to receiving a response that a listener indicates a conflict. For example, upon receiving the notification from the ODX driver of a conflict, the data change initiator driver 52 fails the restore data operation. It should be understood that a DCN Start Notification is followed by a DCN Complete Notification when there are no conflicts.

As used throughout this document, the words "comprising," "including," and "having" are intended to set forth certain items, steps, elements, or aspects of something in in that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the above discussion dealt mainly with a single data change initiator (except inherently in the discussion concerning the internal database). In some arrangements, however, there are multiple data change initiators each of which cause DCN driver 28 to send registered listeners 50 multiple notifications.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be and are hereby included in any of the disclosed embodiments and their variants. Thus, it is understood that features disclosed in connection with any embodiment are included as variants of any other embodiment.

Those skilled in the art will therefore understand that various changes in form and detail may be made to the embodiments disclosed herein without departing from the scope of the invention.

What is claimed is:

1. A method of providing data change notifications in a data storage environment that includes a set of storage devices coupled to a storage processor, the method comprising:
  receiving, in a storage processor, a request from a data change initiator to perform a data change operation in the set of storage devices;
  sending a notification message to each of multiple listeners operating in the storage processor to notify each of the set of listeners that the data change initiator is preparing to perform the data change operation;
  receiving a response from any of the listeners in the storage processor, in response to sending the respective listener a notification message, that the listener indicates a conflict with the data change operation;
  in response to receiving a response that a listener indicates a conflict, directing the data change initiator not to perform the data change operation;
  sending another notification message to another storage processor to notify the other storage processor that the data change initiator is preparing to perform the data change operation;
  receiving a response from the other storage processor that a listener operating in the other storage processor indicates a conflict with the data change operation; and
  directing the data change initiator not to perform the data change operation in response to a listener in the other storage processor indicating a conflict with the data change operation,
  wherein each of the set of listeners operates in a layer of an I/O stack of the storage processor above a layer in which the data change initiator operates and wherein the method further comprises:
  registering each of the set of listeners;
  transmitting a Data Change Notification (DCN) Start notification to each of the set of listeners indicating that the DCN process has started, and
  after receiving the response from each of the set of listeners in the storage processor, transmitting a DCN Complete notification to each of the set of listeners indicating that the DCN process has completed,
  and wherein the method further comprises:
  operating a database in which active DCN notification operations are maintained, an active DCN notification operation being an active data change operation that a data change initiator is preparing to perform; and
  wherein transmitting the DCN Start notification includes:
  adding a record to the database of the active data change operation for which the DCN Start Notification was transmitted, and
  wherein transmitting the DCN Complete notification includes:
  deleting the record from the database of the active data change operation for which the DCN Start Notification was transmitted.

2. A method as in claim 1, further comprising:
  imposing a blackout period on particular ones of the listeners between the transmitting of the DCN Start notification and the transmitting of the DCN Complete notification, the blackout period limiting the operations of the particular listeners.

3. A method as in claim 1, further comprising:
  populating a database in the other storage processor with the active DCN notification operations.

4. A method as in claim 3, further comprising:
  rebooting the storage processor;
  receiving a message from the other storage processor containing the active DCN notification operations maintained in another internal database in the other storage processor;
  populating the database of the storage processor with the active DCN notification operations;
  after populating the internal database, registering each of the listeners; and
  after registering each of the listeners, sending each of the listeners a new set of notification messages, each notification message including an identifier of an active DCN notification operation.

5. A method as in claim 1, further comprising:
  receiving a data change notification from the other storage processor, the data change notification indicating that a data change initiator in the other storage processor is preparing to perform a data change operation;
  sending a set of notification messages to a set of listeners operating in the storage processor to notify each of the set of listeners that the data change initiator is preparing to perform the data change operation;
  after sending the set of notification messages, receiving a response from each of the set of listeners in the storage processor as to whether that listener disapproves of the data change operation; and sending a message to the other storage processor containing the responses from each of the set of listeners.

6. A method as in claim 1, wherein sending the notification message to each of multiple listeners operating in the storage processor includes sending the notification message by the storage processor, wherein receiving the response from the listener in the storage processor that the listener indicates a conflict with the data change operation includes receiving the response by the storage processor, and wherein directing the data change initiator not to perform the data change operation includes directing, by the storage processor, the data change initiator not to perform the data change operation.

7. A method as in claim 1, wherein the storage processor includes a database;

wherein the method further comprises, prior to receiving the request from a data change initiator:
rebooting the storage processor;
receiving a message from another storage processor containing active data change notification (DCN) operations maintained in another database in the other storage processor;
populating the database of the storage processor with the active DCN operations; and
after populating the database, registering each of the multiple listeners; and where in the method further comprises, after registering each of the multiple listeners, sending each of the multiple listeners another set of notification messages, each of the other set of notification messages including an identifier of an active DCN operation.

8. A method as in claim 1, further comprising:
operating a data change notification (DCN) driver in the storage processor,
wherein the DCN driver performs the acts of (i) receiving the request from the data change initiator, (ii) sending the notification message to each of multiple listeners operating in the storage processor, (iii) receiving the response from any of the listeners, and (iv) directing the data change initiator not to perform the data change operation, and
wherein the data change initiator and each of the multiple listeners run within the storage processor.

9. A method as in claim 8, wherein directing the data change initiator not to perform the data change operation results in the data change initiator restarting preparations for performing the data change operation.

10. A data storage system, comprising:
a storage processor; and
a set of storage devices coupled to the storage processor, the storage processor including a set of processing units and memory storing executable instructions, wherein the set of processing units running the executable instructions in the memory form control circuitry constructed and arranged to:
receive a request from a data change initiator to perform a data change operation in the set of storage devices coupled to the storage processor;
send a notification message to each of multiple listeners operating in the storage processor to notify each of the set of listeners that the data change initiator is preparing to perform the data change operation;
receive a response from any of the listeners in the storage processor, in response to sending the respective listener a notification message, that the listener indicates a conflict with the data change operation;
in response to receiving a response that a listener indicates a conflict, direct the data change initiator not to perform the data change operation;
send another notification message to another storage processor to notify the other storage processor that the data change initiator is preparing to perform the data change operation;
receive a response from the other storage processor that a listener operating in the other storage processor indicates a conflict with the data change operation; and
direct the data change initiator not to perform the data change operation in response to a listener in the other storage processor indicating a conflict with the data change operation,
wherein each of the set of listeners operates in a layer of an I/O stack of the storage processor above a layer in which the data change initiator operates,
wherein the control circuitry constructed and arranged to send the set of notification messages to the set of listeners operating in the first storage processor is further constructed and arranged to register each of the set of listeners, and
wherein the control circuitry is further constructed and arranged to:
transmit a Data Change Notification (DCN) Start notification to each of the set of listeners indicating that the DCN process has started;
after receiving the response from each of the set of listeners in the storage processor, transmit a DCN Complete notification to each of the set of listeners indicating that the DCN process has completed; and
operate a database in which active DCN notification operations are maintained, an active DCN notification operation being an active data change operation that a data change initiator is preparing to perform,
wherein the control circuitry constructed and arranged to transmit the DCN Start notification is further constructed and arranged to:
add a record to the database of the active data change operation for which the DCN Start Notification was transmitted, and
wherein the control circuitry constructed and arranged to transmit the DCN Complete notification is further constructed and arranged to:
delete the record from the database of the active data change operation for which the DCN Start Notification was transmitted.

11. A data storage system as in claim 10 wherein the control circuitry is further constructed and arranged to:
impose a blackout period on particular ones of the listeners between the transmitting of the DCN Start notification and the transmitting of the DCN Complete notification, the blackout period limiting the operations of the particular listeners.

12. A data storage system as in claim 10, wherein the control circuitry is further constructed and arranged to:
populate a database in the other storage processor with the active DCN notification operations.

13. A data storage system as in claim 12, wherein the control circuitry is further constructed and arranged to:
reboot the storage processor;

receive a message from the other storage processor containing the active DCN notification operations maintained in another internal database in the other storage processor;

populate the database of the storage processor with the active DCN notification operations;

after populating the internal database, register each of the listeners; and after registering each of the listeners, send each of the listeners a new set of notification messages, each notification message including an identifier of an active DCN notification operation.

14. A computer program product having a non-transitory, computer-readable storage medium which stores instructions which, when executed by a computing device, cause the computing device to perform a method of providing data change notifications, the method comprising:

receiving, in a storage processor, a request from a data change initiator to perform a data change operation in a set of storage devices coupled to the storage processor;

sending a notification message to each of multiple listeners operating in the storage processor to notify each of the set of listeners that the data change initiator is preparing to perform the data change operation;

receiving a response from any of the listeners in the storage processor, in response to sending the respective listener a notification message, that the listener indicates a conflict with the data change operation;

in response to receiving a response that a listener indicates a conflict, causing the data change initiator to abort the data change operation;

sending another notification message to another storage processor to notify the other storage processor that the data change initiator is preparing to perform the data change operation;

receiving a response from the other storage processor that a listener operating in the other storage processor indicates a conflict with the data change operation; and directing the data change initiator not to perform the data change operation in response to a listener in the other storage processor indicating a conflict with the data change operation, wherein each of the set of listeners operates in a layer of an I/O stack of the storage processor above a layer in which the data change initiator operates and wherein the method further comprises:

registering each of the set of listeners;

transmitting a Data Change Notification (DCN) Start notification to each of the set of listeners indicating that the DCN process has started, and after receiving the response from each of the set of listeners in the storage processor, transmitting a DCN Complete notification to each of the set of listeners indicating that the DCN process has completed, and wherein the method further comprises:

operating a database in which active DCN notification operations are maintained, an active DCN notification operation being an active data change operation that a data change initiator is preparing to perform, wherein transmitting the DCN Start notification includes adding a record to the database of the active data change operation for which the DCN Start Notification was transmitted, and wherein transmitting the DCN Complete notification includes deleting the record from the database of the active data change operation for which the DCN Start Notification was transmitted.

* * * * *